US012769643B2

(12) United States Patent
Linstadt et al.

(10) Patent No.: US 12,769,643 B2
(45) Date of Patent: Oct. 20, 2026

(54) DRAM METADATA ACCESS

(71) Applicant: Rambus Inc., San Jose, CA (US)

(72) Inventors: John Eric Linstadt, Palo Alto, CA (US); Thomas Vogelsang, Jericho, VT (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/775,487

(22) Filed: Jul. 17, 2024

(65) Prior Publication Data

US 2025/0045197 A1 Feb. 6, 2025

Related U.S. Application Data

(60) Provisional application No. 63/529,907, filed on Jul. 31, 2023.

(51) Int. Cl.
*G06F 12/02* (2006.01)

(52) U.S. Cl.
CPC ................................ *G06F 12/0223* (2013.01)

(58) Field of Classification Search
CPC .................................................. G06F 12/0223
See application file for complete search history.

(56) References Cited

U.S. PATENT DOCUMENTS 7,668,040 B2 2/2010 Ikeda et al.
9,792,975 B1 10/2017 Hsieh
10,468,093 B2 11/2019 Chatterjee et al.
10,629,248 B2 4/2020 Kim et al.
10,838,851 B2 11/2020 Jacob et al.
11,152,053 B2 * 10/2021 Kwon ................. G11C 11/4096
11,288,188 B1 * 3/2022 Tummala ............ G06F 12/0215
2005/0015538 A1 1/2005 Van't Wout et al.
2005/0132147 A1 * 6/2005 Arimilli ................ G06F 9/3851 711/E12.004
2008/0189467 A1 * 8/2008 Ikeda ....................... G11C 8/12 711/E12.003
2024/0272984 A1 * 8/2024 Ayyapureddi ...... G06F 11/1012

FOREIGN PATENT DOCUMENTS

WO WO-2021-041445 A1 3/2021

* cited by examiner

*Primary Examiner* — Kaushikkumar M Patel
*Assistant Examiner* — Christian Joseph O'Connell
(74) *Attorney, Agent, or Firm* — The Neudeck Law Firm, LLC

(57) ABSTRACT

A memory device includes functionality (e.g., mode, command, etc.) to concurrently activate/access a plurality of rows across a corresponding plurality of memory banks. When concurrently accessing the memory banks, the row address and column address are provided to all of the memory banks being accessed. Multiplexer/demultiplexer (e.g., steering logic) may be used to route non-payload (e.g., metadata) from the concurrently activated memory banks to/from the data interface of the memory device. The steering logic may route and/or serialize the metadata from the concurrently activated memory banks of the bank group such that the non-payload data from a respective memory bank is communicated via the same data signal(s) (e.g., DQ[0], DQ[1], etc.) of the data interface.

19 Claims, 13 Drawing Sheets

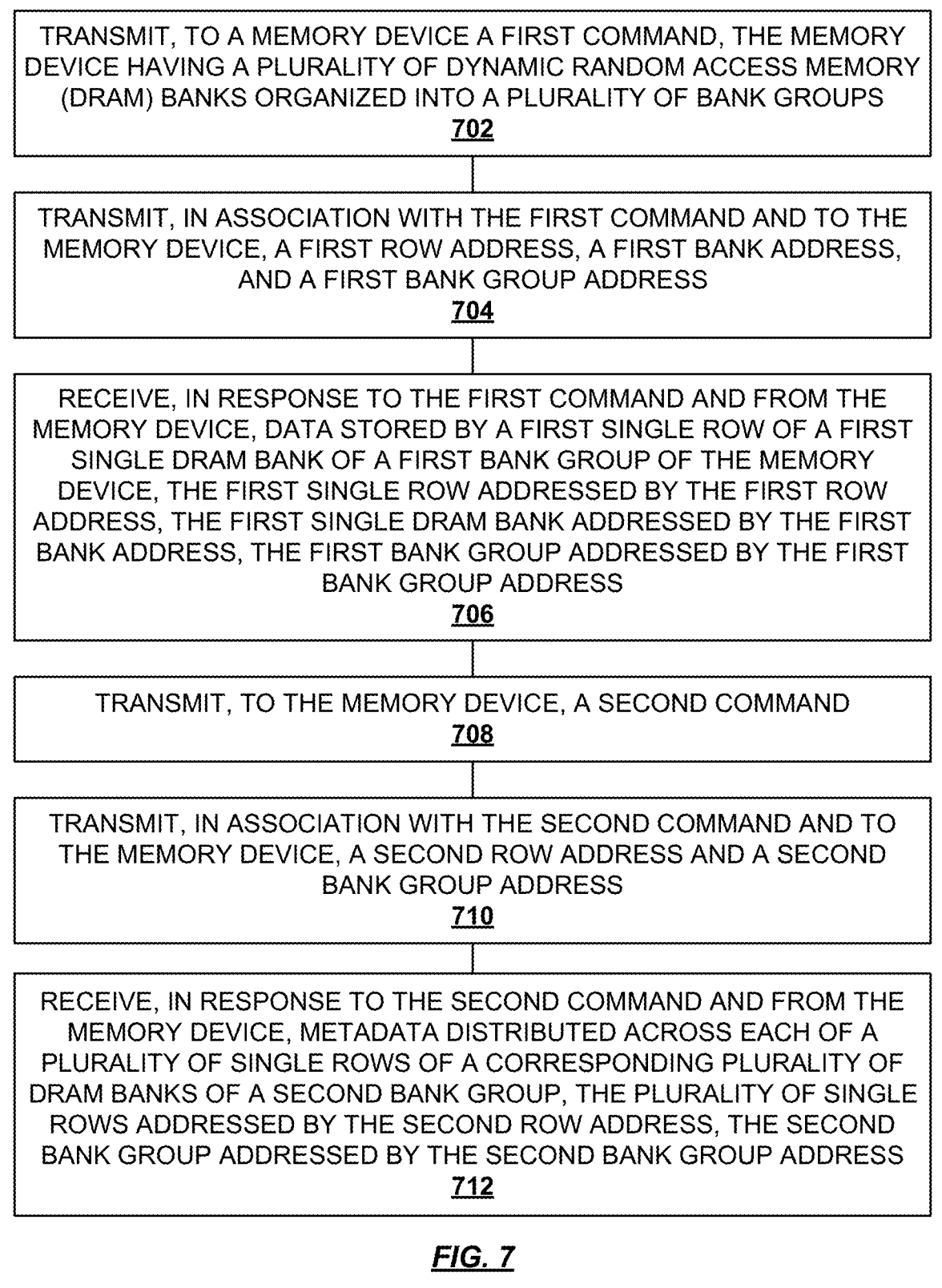

TRANSMIT, TO A MEMORY DEVICE A FIRST COMMAND, THE MEMORY DEVICE HAVING A PLURALITY OF DYNAMIC RANDOM ACCESS MEMORY (DRAM) BANKS ORGANIZED INTO A PLURALITY OF BANK GROUPS
702

TRANSMIT, IN ASSOCIATION WITH THE FIRST COMMAND AND TO THE MEMORY DEVICE, A FIRST ROW ADDRESS, A FIRST BANK ADDRESS, AND A FIRST BANK GROUP ADDRESS
704

RECEIVE, IN RESPONSE TO THE FIRST COMMAND AND FROM THE MEMORY DEVICE, DATA STORED BY A FIRST SINGLE ROW OF A FIRST SINGLE DRAM BANK OF A FIRST BANK GROUP OF THE MEMORY DEVICE, THE FIRST SINGLE ROW ADDRESSED BY THE FIRST ROW ADDRESS, THE FIRST SINGLE DRAM BANK ADDRESSED BY THE FIRST BANK ADDRESS, THE FIRST BANK GROUP ADDRESSED BY THE FIRST BANK GROUP ADDRESS
706

TRANSMIT, TO THE MEMORY DEVICE, A SECOND COMMAND
708

TRANSMIT, IN ASSOCIATION WITH THE SECOND COMMAND AND TO THE MEMORY DEVICE, A SECOND ROW ADDRESS AND A SECOND BANK GROUP ADDRESS
710

RECEIVE, IN RESPONSE TO THE SECOND COMMAND AND FROM THE MEMORY DEVICE, METADATA DISTRIBUTED ACROSS EACH OF A PLURALITY OF SINGLE ROWS OF A CORRESPONDING PLURALITY OF DRAM BANKS OF A SECOND BANK GROUP, THE PLURALITY OF SINGLE ROWS ADDRESSED BY THE SECOND ROW ADDRESS, THE SECOND BANK GROUP ADDRESSED BY THE SECOND BANK GROUP ADDRESS
712

*FIG. 7*

DRAM METADATA ACCESS

BRIEF DESCRIPTION OF THE DRAWINGS

FIG. 7 is a flowchart illustrating a method of accessing a variable number of memory banks.

DETAILED DESCRIPTION OF THE EMBODIMENTS

In an embodiment, a memory device includes functionality (e.g., mode, command, etc.) to concurrently activate/access a plurality of rows across a corresponding plurality of memory banks. In an embodiment, the plurality of memory banks belong to the same bank group. When concurrently accessing the memory banks of a bank group, the row address and column address are provided to all of the memory banks of the bank group.

In an embodiment, additional multiplexer/demultiplexer (e.g., steering logic) may be used to route non-payload (e.g., host metadata, non-host metadata such as memory device metadata, memory device counters, controller generated metadata, etc.) from the concurrently activated memory banks of the bank group to/from the data interface of the memory device. The steering logic may route and/or serialize the metadata from the concurrently activated memory banks of the bank group such that the non-payload data from a respective memory bank is communicated via the same data signal(s) (e.g., DQ[0], DQ[1], etc.) of the data interface. The steering logic may route and/or serialize the metadata from the concurrently activated memory banks of the bank group such that the non-payload data is communicated via the data interface using the same bit width and/or burst length as host data is communicated when only one memory bank is accessed.

The descriptions and embodiments disclosed herein may be made with references to DRAM memory devices. This, however, should be understood to be a first example. Other example memory technologies include, but are not limited to static random access memory (SRAM), non-volatile memory (such as flash), conductive bridging random access memory (CBRAM—a.k.a., programmable metallization cell-PMC), resistive random access memory (a.k.a., RRAM or ReRAM), magnetoresistive random-access memory (a.k.a., MRAM), Spin-Torque Transfer (a.k.a., STT-MRAM), phase change memory (a.k.a., PCM), ferroelectric random access memory (a.k.a., FeRAM, or FRAM), and the like, and/or combinations thereof. Accordingly, it should be understood that in the disclosures and/or descriptions given herein, these aforementioned technologies may be substituted for, included with, and/or encompassed within, references to memory IC die, memory devices, memory, DRAM, DRAM devices, memory arrays, and/or DRAM arrays made herein.

Figure 1A:
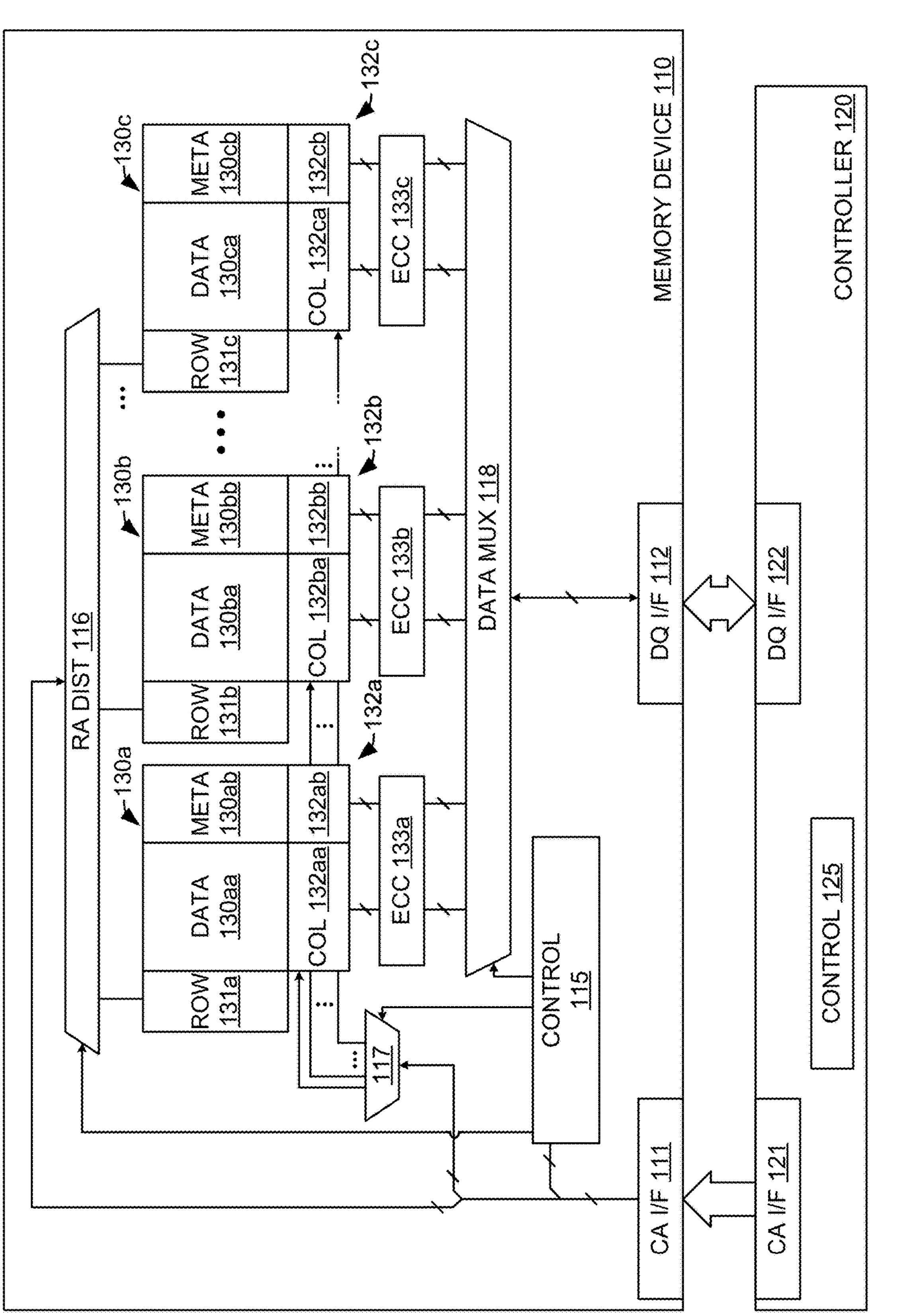
FIGS. 1A-1C illustrate a system with metadata access.
Figure 1B:
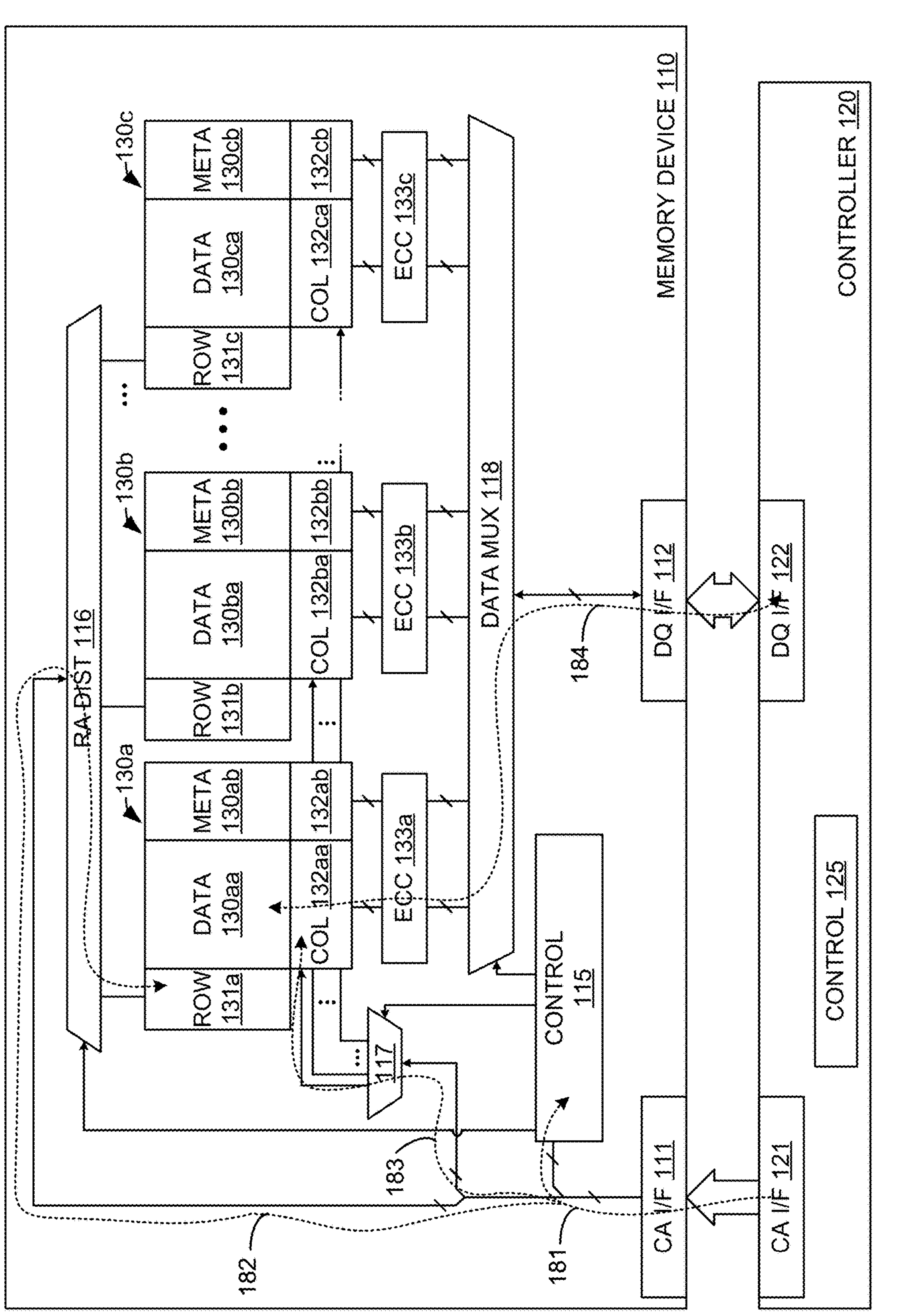
Figure 1C:
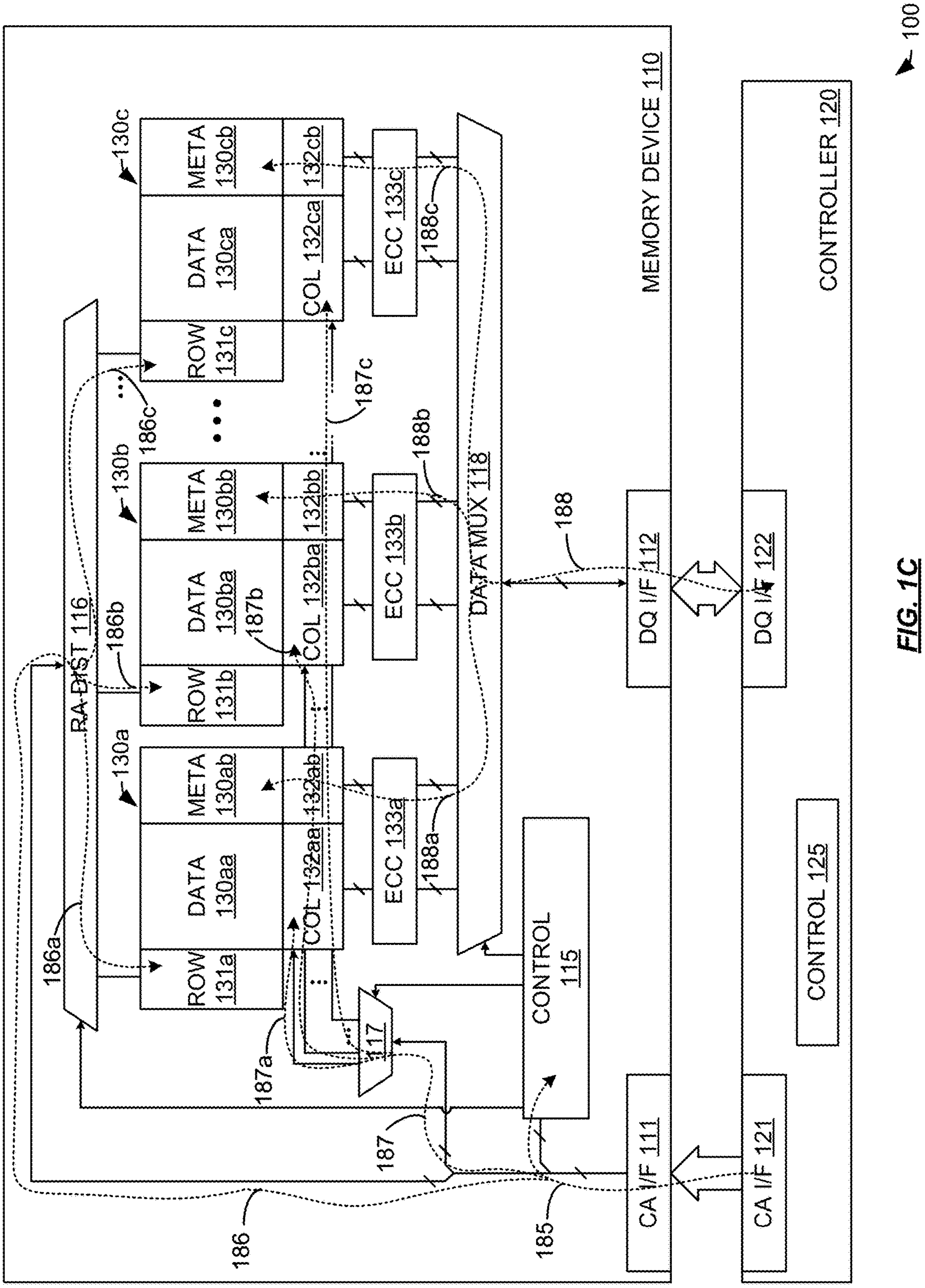

FIGS. 1A-1C illustrate a system with metadata access. In FIGS. 1A-1C, memory system 100 comprises memory device 110 and controller 120. Memory device 110 includes command/address (CA) interface 111, data (DQ) interface 112, control circuitry 115, row address distribution circuitry 116, column address distribution circuitry 117, data multiplexer (MUX) circuitry 118, and error control circuitry **133*a*-133*c*, memory arrays 130*a*-130*c*, row circuitry 131*a*-131*c*, and column circuitry 132*a*-132*c*. In some embodiments, memory arrays 130*a*-130*c* are each addressed and used as a bank of memory device 110. Respective row circuitry 131*a*-131*c*, and respective column circuitry 132*a*-132*c*, are coupled to memory arrays 130*a*-130*c* to access information stored by memory arrays 130*a*-130*c*. In an embodiment, memory arrays 130*a*-130*c* are configured as a bank group. The rows and columns of memory arrays 130*a*-130*c* may be organized into rows and columns of memory array tiles (MATs). Memory controller 120 includes CA interface 121, DQ interface 122, and control circuitry 125**.

CA interface 121 of controller 120 is operatively coupled to CA interface 111 of memory device 110. CA interface 121 of controller 120 is operatively coupled to CA interface 111 of memory device 110 to at least communicate, from controller 120, commands, addresses, and configuration information to memory device 110. DQ interface 122 of controller 120 is operatively coupled to DQ interface 112 of memory device 110. DQ interface 122 of controller 120 is operatively coupled to DQ interface 112 of memory device 110 to communicate data between controller 120 and memory device 110.

Memory controller 120 and memory device 110 may be integrated circuit type devices, such as are commonly referred to as "chips". A memory controller, such as memory controller 120, manages the flow of data going to and from memory devices and/or memory modules. Memory device 110 may be a standalone device, or may be a component of a memory module such as a DIMM module used in servers. Memory device 110 may be, or be part of, a component having a "stack" of memory devices. Memory device 110 may be a device that adheres to, or is compatible with, a dynamic random access memory (DRAM) specification. A memory controller can be a separate, standalone chip, or integrated into another chip. For example, a memory controller 120 may be included on a single die with a microprocessor, included as a chip co-packaged with one or more microprocessor chips, included as part of a more complex integrated circuit system such as a block of a system on a chip (SOC), or be remotely coupled to one or more microprocessors via a fabric interconnect or other type of interconnect.

CA interface 111 of memory device 110 is operatively coupled to row address distribution circuitry 116, column address distribution circuitry 117, and control circuitry 115. Row address distribution circuitry 116 is operatively coupled to row circuitry **131*a*-131*c*. Column address distribution circuitry 117 is operatively coupled to column circuitry 132*a*-132*c*. Row address distribution circuitry 116 is operatively coupled to row circuitry 131*a*-131*c* to at least activate rows in one or more of memory arrays 130*a*-130*c*. Column address distribution circuitry 117 is operatively coupled to column circuitry 132*a*-132*c* to at least sense values from activated rows, and to decode and provide the values of selected columns to other circuitry of memory device 110 (e.g., corresponding error control circuitry 133***a*-133*c*, data MUX circuitry 118, etc.) Error control circuitry 133*a*-133*c* may comprise error-detection code (EDC) and/or error correction code (ECC) functionality to detect and/or correct data and/or metadata errors.

Memory array 130*a* of memory device 110 is logically subdivided into column group 130*aa*-130*ab* (or MAT groups, columns of MATs, sections, assignments, and/or associations). Memory array 130*b* of memory device 110 is logically subdivided into column group 130*ba*-130*bb*. Memory array 130*c* of memory device 110 is logically subdivided into column group 130*ca*-130*cb*. Data column groups 130*aa*-130*ca* are to store data (e.g., host data) provided to controller 120. Metadata information fields 130*ab*-130*cb* are to store metadata associated with the rows in memory arrays 130*a*-130*c*. Thus, it should be understood that each row of memory arrays 130*a*-130*c* may be viewed as comprising two "fields"—a data field and a metadata field. In an embodiment, the metadata field of a row may be used to store a counter value or other information related to the row it is associated with and/or resides in (i.e., is activated in response to the same row address as the rest of the row—a.k.a., metadata field). At least how and when the metadata values associated with the rows of memory arrays 130*a*-130*c* are used and/or updated is controlled, commanded, and/or configured by controller 120.

Figure 1D:
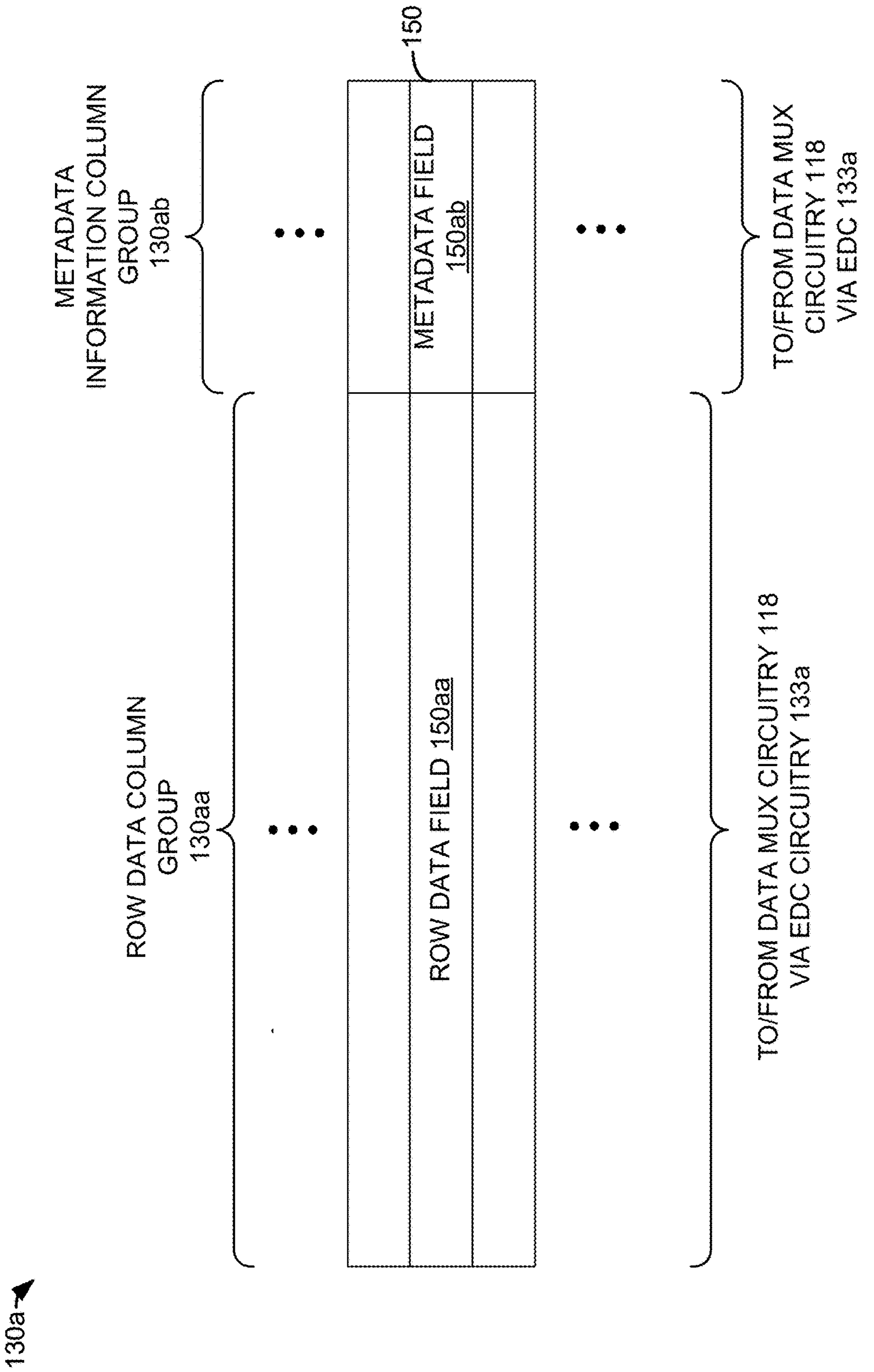
FIG. 1D is an illustration of example information fields in a memory array row.

FIG. 1D is an illustration of example information fields in a memory array row. FIG. 1D uses memory array 130*a* as an example. Thus, it should be understood that memory arrays 130*b*-130*c* also include information fields that correspond to those illustrated in FIG. 1D with respect to memory array 130*a*. In FIG. 1D, row 150*a* (a.k.a., row information entry) includes row data field 150*aa* and metadata field 150*ab*. The row data information stored by row data field 150*aa* is from the cells of row information entries 150*a* that are part of data column group 130*aa*. The metadata information stored by metadata field 150*ab* is from the cells of row information entry 150 that are part of metadata column group 130*ab*.

Returning now to FIGS. 1A-1C, column circuitry 132*a*-132*c* is subdivided into column circuitry groups 132*aa*-132*ab* 132*ba*-132*bb* 132*ca*-132*cb* that may have different access timing requirements. For example, metadata information fields 130*ab* 130*bb* 130*cb*, which are activated and written by respective column circuitry group 132*ba* 132*bb* 132*cb*, may comprise smaller MATs. This may allow metadata information fields 130*ab* 130*bb* 130*cb* to be accessed (e.g., read, written, refreshed, etc.) in less time than column groups 130*aa* 130*ba* 130*ca*.

In an embodiment, memory device 110 operates in at least two modes. In a first mode, memory device 110, in response to per-row commands (e.g., activate-ACT) or per-row column commands (e.g., read-RD, write-WR, etc.) updates (e.g., writes, increments, decrements, compares, etc. under the control of control circuitry 115), the metadata field (e.g., metadata field 150*ab*) of a single memory array (e.g., memory array 130*a*) as part of the process of performing the per-row or per-row column command. Also in this first mode, per-row or per-row column commands that communicate data via DQ interface 112 (e.g., as selected by data MUX circuitry 118) communicate the data from/to the row data field (e.g., row data field 150*aa*) of that single row of the single memory array (e.g., memory array 130*a*).

In particular, for example, in the first mode, and in response to a per-row activate (ACT) command, control circuitry 115 configures row address distribution circuitry 116 to activate a single row in a single one of memory arrays (e.g., only memory array 130*a* of memory arrays 130*a*-130*c*) thereby placing the contents of that row in column circuitry 132*a*. In response to a per-row column access command (e.g., read or write), control circuitry 115 configures data MUX circuitry 118 to route the addressed column data from/to the row data field (e.g., the row data from column circuitry group 132*aa*) to/from DQ interface 112).

In a second mode (e.g., in response to a command, register value, etc.), in an embodiment, memory device 110 accesses (e.g., reads or writes) data communicated via DQ interface 112 (e.g., as selected by data MUX circuitry 118) from/to the metadata field (e.g., metadata field 150*ab*). In an embodiment, memory device 110 may, in the second mode, access the rows of all of a group of memory arrays (e.g., memory arrays 130*a*-130*c*). In particular, if the memory arrays 130-130*c* are organized into bank groups, memory device 110 may, in the second mode, access the addressed row in all of the memory arrays (e.g., memory arrays 130*a*-130*c*) of the addressed bank group and communicate the data in the metadata fields of those rows via DQ interface 112. In other words, for example, while in the second mode (such as in response to a "per bank group" command—e.g., "activate bank group"—ACTbg), memory device 110 (e.g., under the control of control circuitry 115) provides the row address to all of the memory arrays 130*a*-130*c* of the bank group using row address distribution circuitry 116. In an embodiment, memory device 130 may have different timing (e.g., command to data, row command to column command, etc.) for concurrently activating and/or accessing the addressed row in all of the memory arrays 130*a*-130*c* of a bank group (i.e., in the second mode) when compared to activating and/or accessing only a row in a single memory array (i.e., in the first mode).

In an embodiment, controller 120, under the control of control circuitry 125, transmits a per-row command (e.g., activate command, precharge command) and an associated row address, to memory device 110. Controller also transmits a single-bank column command (e.g., read or write) and an associated column address. These are illustrated in FIG. 1B by arrow 181 running from CA interface 121 through CA interface 111 to control circuitry 115. The per-row command may be, for example, interpreted as a "per-row" command by memory device 110 based on memory device 110 being in a first mode (e.g., memory device 110 was placed in a "per-row" mode by a mode register set command previously transmitted by controller 120). In another example, memory device may be configured and/or constructed to default to interpreting the per-row command, and certain other commands, as row command directed to a single memory array (e.g., memory array 130*a*).

Based on the per-row command and at least a portion of the associated row address, control circuitry 115 configures row address distribution circuitry 116 to provide an indicator of the associated row address to row circuitry 131*a* that is coupled with a single memory array 130*a* to (at least) activate/precharge rows in that single memory array 130*a*. This is illustrated in FIG. 1B by arrow 182 running from arrow 181 through row address distribution circuitry 116 to row circuitry 131*a*.

Based on the single bank column command, control circuitry 115 configures column address distribution circuitry 117 to provide an indicator of the associated column address to column circuitry 132*a* that is coupled with the single memory array 130*a* to (at least) receive values stored and/or to be stored in the row addressed by the associated row address. This is illustrated in FIG. 1B by arrow 183 running from arrow 181 through column address distribution circuitry 117 to column circuitry 132*a*.

Based on the per-row command being a per-row command (e.g., based on memory device being in the first mode or the command defaulting to being a per-row command), control circuitry 115 configures data MUX circuitry 118 to communicate respective read/write data respectively from/to data column group 130*aa* respectively to/from DQ interface 112 via column circuitry group 132*aa*, and ECC 133*a*. This is illustrated in FIG. 1B by double headed arrow 184 running between DQ interface 122 of controller 120 and data column group 130*aa* via DQ interface 112, data MUX circuitry 118, ECC 133*a*, and column circuitry group 132*aa*.

In an embodiment, controller 120, under the control of control circuitry 125, transmits a multi-bank row command (e.g., activate command, precharge command) and an associated row address, to memory device 110. Controller also transmits a multi-bank column command (e.g., read or write). In some embodiments, controller 120 may also transmit an associated column address. These are illustrated in FIG. 1C by arrow 185 running from CA interface 121 through CA interface 111 to control circuitry 115. The multi-bank row command may be, for example, interpreted as a "multi-bank" row command by memory device 110 based on memory device 110 being in a second mode (e.g., memory device 110 was placed in a "multi-bank" mode by a mode register set command previously transmitted by controller 120). In another example, memory device may be configured and/or constructed to default to interpreting the multi-bank row command (e.g., activate bank group—ACTbg, or activate same bank in all bank groups—ACT sb) and, in some embodiments, certain other commands, as a row command directed to a plurality of memory arrays 130*a*-130*c*.

Based on the multi-bank row command and at least a portion of the associated row address, control circuitry 115 configures row address distribution circuitry 116 to provide an indicator of the associated row address to row circuitries 131*a*-131*c* that are respectively coupled with a plurality of memory arrays 130*a*-130*c* to (at least) activate/precharge rows in those memory arrays 130*a*-130*c*. This is illustrated in FIG. 1C by arrow 186 running from arrow 185 to row address distribution circuitry 116, and respective arrows 186*a*-186*c* splitting from arrow 186 in row address distribution circuitry 116 and running to respective row circuitry 131*a*-131*c*.

Based on the multi-bank column command, control circuitry 115 configures column address distribution circuitry 117 to provide an indicator of the associated column address to column circuitries 132*a*-132*c* that are respectively coupled with a plurality of memory arrays 130*a*-130*c* to (at least) receive values stored and/or to be stored in the row of each memory array 130*a*-130*c* addressed by the associated row address. This is illustrated in FIG. 1C by arrow 187 running from arrow 185 to column address distribution circuitry 117, and respective arrows 187*a*-187*c* splitting from arrow 187 in column address distribution circuitry 117 and running to respective column circuitry 132*a*-132*c*.

Based on the multi-bank row command being a multi-bank row command (e.g., based on memory device being in the second mode or the command defaulting to being a multi-bank row command), control circuitry 115 configures data MUX circuitry 118 to communicate respective read/write data respectively from/to respective metadata column groups 130*ab*-130*cb* respectively to/from DQ interface 112 via respective column group circuitries 132*ab*-132*cb*, and respective ECC 133*a*-133*c*. This is illustrated in FIG. 1C by arrow 188 running between DQ interface 122 of controller 120 to DATA MUX 118, and respective arrows 188*a*-188*c* splitting from arrow 188 in column address distribution circuitry 117 and running to respective metadata column groups 130*ab*-13*cb* via respective column group circuitries 132*ab*-132*cb*, and respective ECC 133*a*-133*c*.

Figure 2:
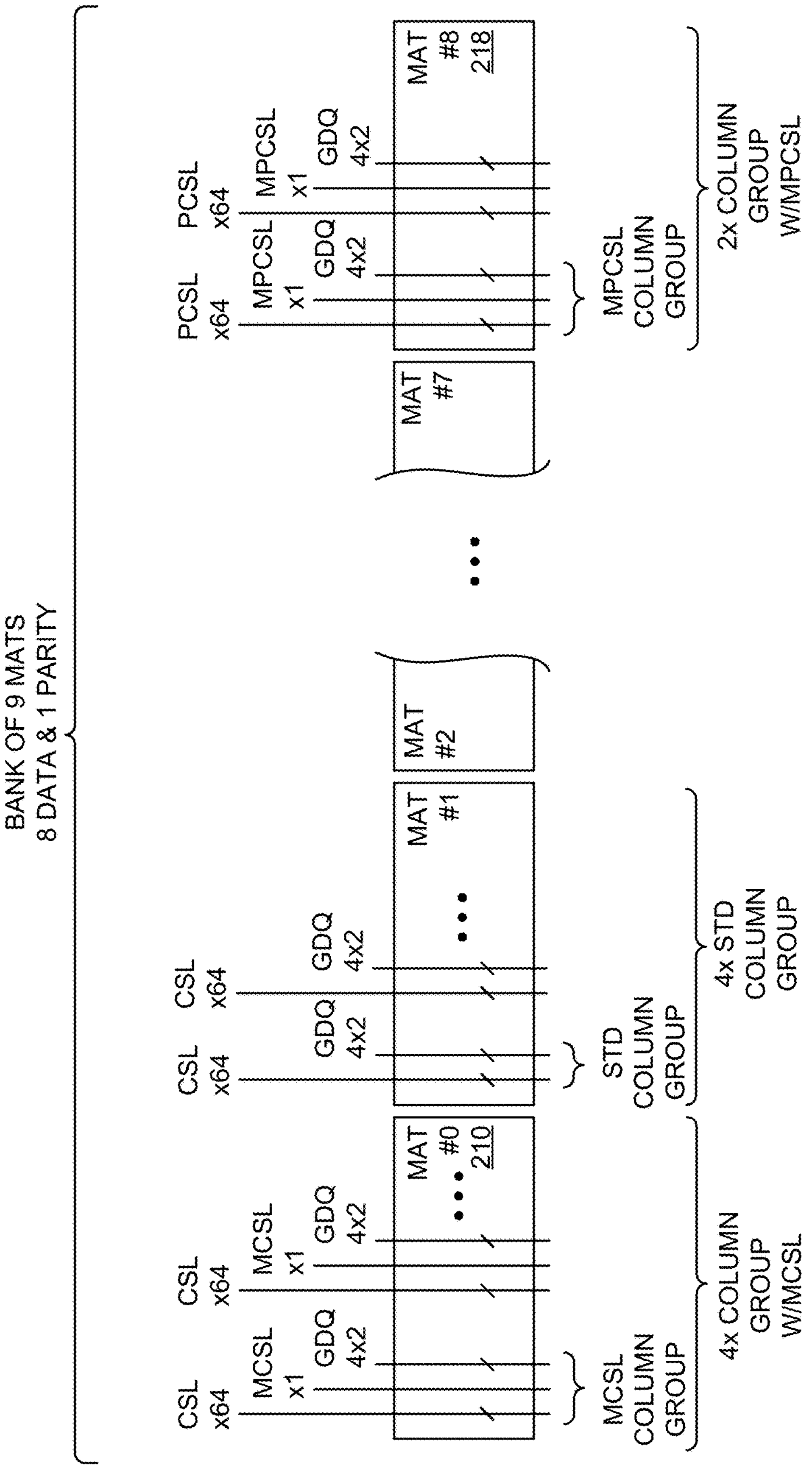
FIG. 2 is a diagram illustrating a memory bank architecture.

FIG. 2 is a diagram notionally illustrating a memory bank architecture. In FIG. 2, a bank is composed of nine (9) MATs—MATs #0-#8. MATs #0-#7 are considered "data" MATs. Data MATs #1-#7 have 1024 "data" bitlines. Each of MATs #1-#7 are accessed using (i.e., configured with) four (8) "standard" groupings of four (4) global data line (GDQ) pairs with 64 column select lines (CSL) each. Note that GDQ pairs use differential signaling, transporting 1 bit per pair and therefore there are 16 bits accessed concurrently per MAT. Data MAT #0 210 includes "extra" column select lines to access metadata. In particular, MAT #0 210 is accessed using four (4) "metadata" groupings of four (4) global data line (GDQ) pairs with 64 column select lines (CSL) and one (1) metadata column select line (MCSL) each. Thus, data MAT #0 210, having four metadata select lines (MCSLs) can access sixteen (16) bits of metadata by sharing the four GDQ pairs with the columns used to access sixteen (16) bits of regular (e.g., "host") data.

MAT #8 218 is considered a "parity" MAT. Parity MAT #8 has 512 bitlines. Parity MAT #8 218 includes column select lines to access metadata parity (i.e., parity data associated with metadata). In particular, MAT #8 218 is accessed using two (2) "metadata parity" groupings of four (4) global data line (GDQ) pairs with 64 column select lines (CSL) and one (1) metadata parity column select line (MPCSL) each. Thus, data MAT #8 218, having two metadata parity select lines (MPCSLs) can access eight (8) bits of metadata parity data by sharing the two GDQ pairs with the columns used to access regular (e.g., "host") data parity or ECC. In this embodiment, ECC circuitry 133 is shared between regular data accesses and metadata accesses and the 16 bits of metadata are padded with 96 bits of fixed data to fit the (136,128) ECC. In another embodiment, metadata access might have a dedicated separate ECC circuit and use part of the metadata as parity for the metadata e.g., using a (16,11) code. In that case MAT #8 218 does not require to provide parity bits in a metadata access.

Figure 3:
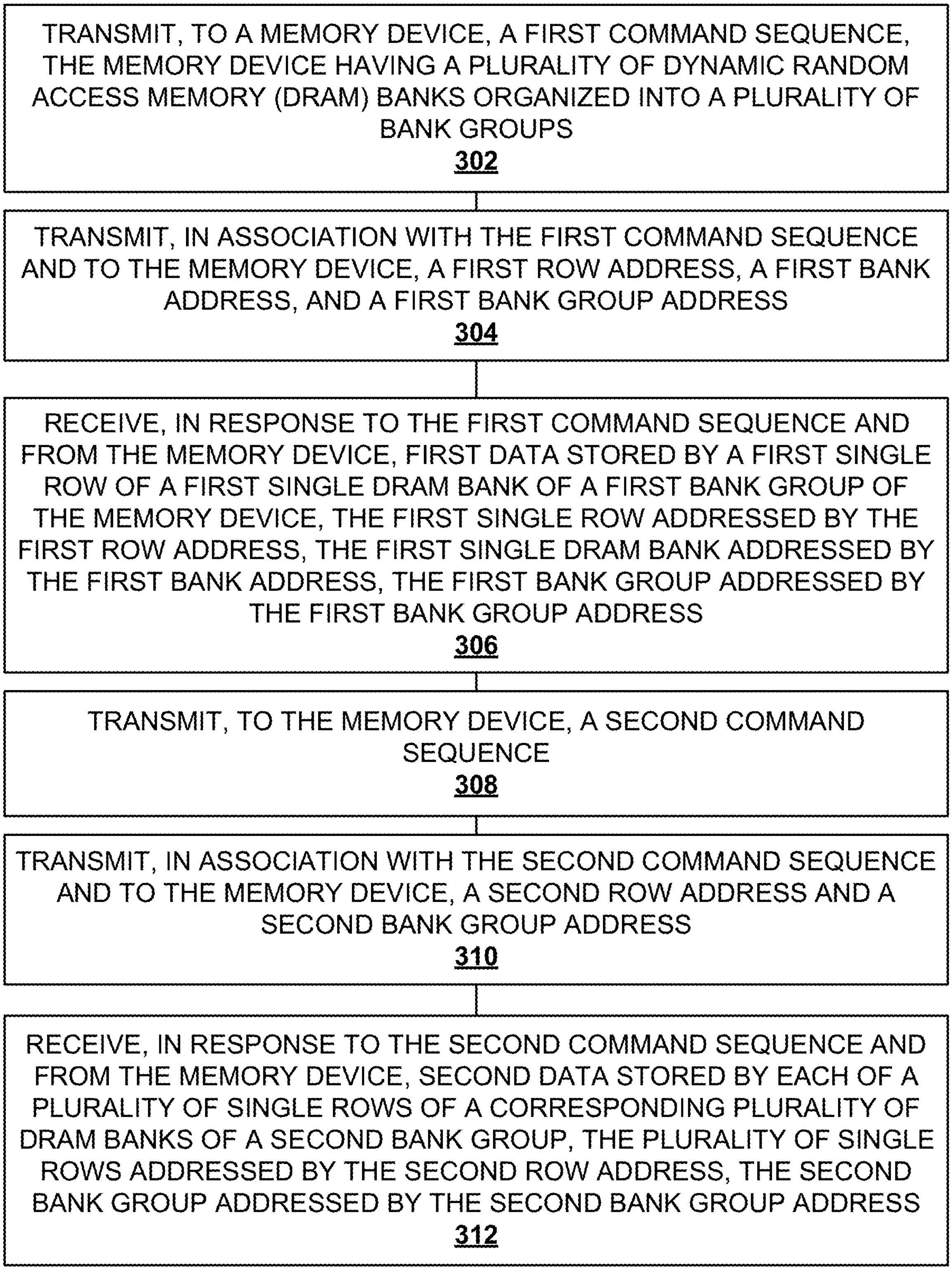
FIG. 3 is a flowchart illustrating a method of accessing host data and metadata.

FIG. 3 is a flowchart illustrating a method of accessing host data and metadata. One or more of the steps illustrated in FIG. 3 may be performed by, for example, memory system 100, and/or its components. To a memory device, a first command sequence is transmitted where the memory device has a plurality of dynamic random access memory (DRAM) banks organized into a plurality of bank groups (302). For example, controller 120, under the control of control circuitry 125, may transmit a first command sequence (e.g., ACT followed by RD, and/or MRS followed by ACT, followed by RD) to memory device 110 which has a plurality of DRAM banks (memory arrays 130*a*-130*c*) organized as a plurality of bank groups.

In association with the first command sequence, and to the memory device, a first row address, a first bank address, and a first bank group address are transmitted (304). For example, in association with the first command sequence, controller 120 may transmit, to memory device 110, a first row address that includes fields for a first bank group address value, a first bank address value, and a first row of the bank address value. In response to the first command sequence and from the memory device, first data stored by a first single row of a first single DRAM bank of a first bank group of the memory device is received, where the first single row was addressed by the first row address, the first single DRAM bank was addressed by the first bank address, and the first bank group was addressed by the first bank group address (306). For example, from memory device 110, controller 120 may receive, in response to the first command sequence (e.g., ACT followed by a RD, and/or MRS followed by ACT, followed by RD) transmitted to memory device 110, a burst (e.g., 16 bytes) of data from the row addressed by the first bank group address value, the first bank address value, and the first row of the bank address value.

To the memory device, a second command sequence is transmitted (308). For example, controller 120, under the control of control circuitry 125, may transmit a second command sequence (e.g., ACTbg followed by a RD, and/or MRS followed by ACT, followed by RD) to memory device 110. In association with the second command sequence, and to the memory device, a second row address and a second bank group address are transmitted (310). For example, in association with the second command sequence, controller 120 may transmit, to memory device 110, a second row address that includes fields for a second bank group address value, a second bank address value, and a second row of the bank address value. In an example, the second bank address value may be ignored by memory device 110.

In response to the second command sequence and from the memory device, second data stored by each of a plurality of single rows of a corresponding plurality of DRAM banks of a second bank group of the memory device is received, where the plurality of single rows were addressed by the second row address, and the second bank group was addressed by the second bank group address (312). For example, from memory device 110, controller 120 may receive, in response to the second command sequence (e.g., ACTbg followed by RD, and/or MRS followed by ACT, followed by RD) transmitted to memory device 110, a burst (e.g., 16 bytes) of data from the rows in each of memory arrays 130*a*-130*c* addressed by the second row of the bank address value.

Figure 4:
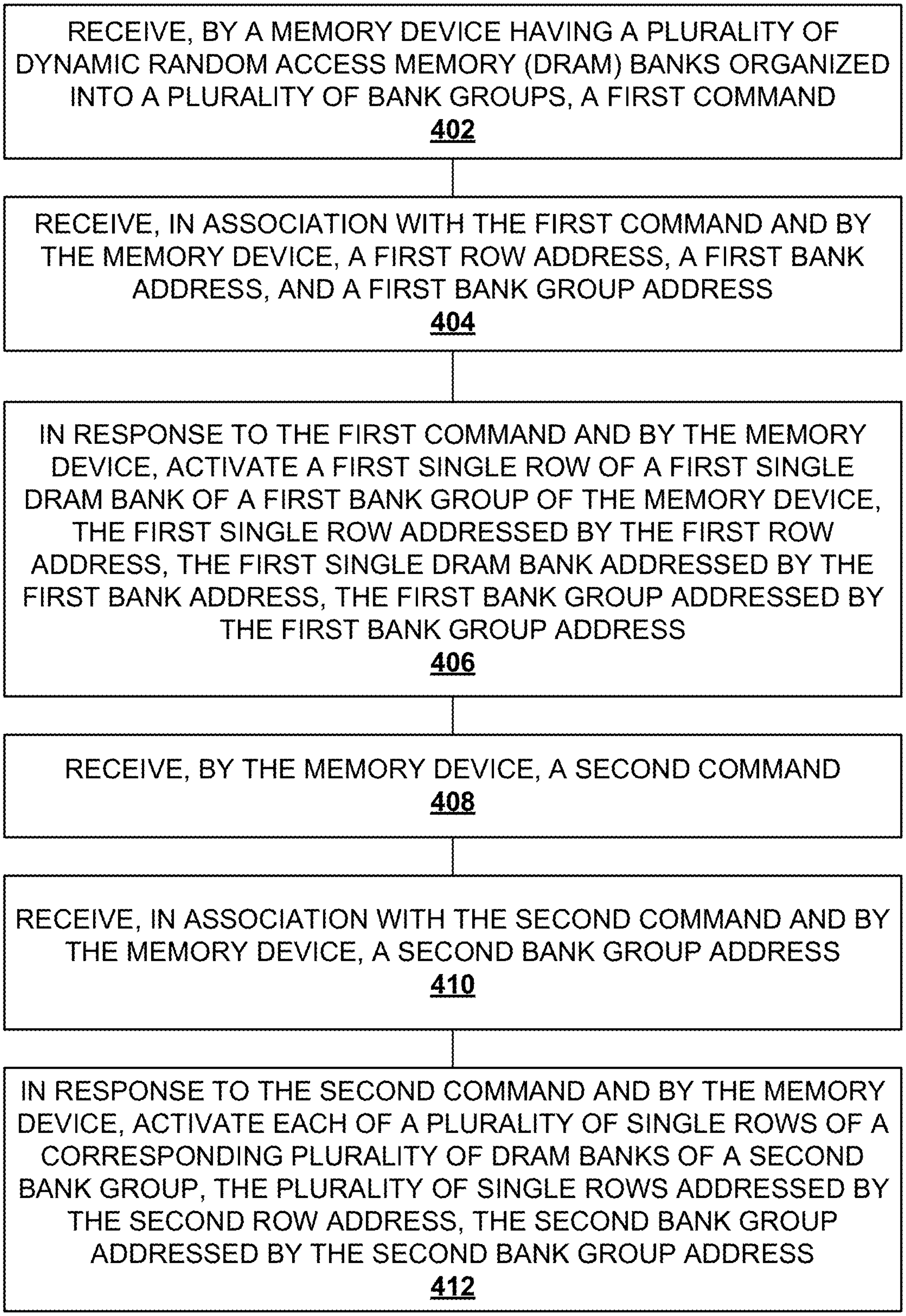
FIG. 4 is a flowchart illustrating a method of activating rows.

FIG. 4 is a flowchart illustrating a method of activating rows. One or more of the steps illustrated in FIG. 4 may be performed by, for example, memory system 100, and/or its components. By a memory device, a first command is received where the memory device has a plurality of dynamic random access memory (DRAM) banks organized into a plurality of bank groups (402). For example, memory device 110 may receive, from controller 120, a first command from controller 120 where memory device 110 has a plurality of DRAM banks (memory arrays 130*a*-130*c*) organized as a plurality of bank groups.

In association with the first command, and by the memory device, a first row address, a first bank address, and a first bank group address are received (404). For example, in association with the first command and from controller 120, memory device 110 may receive a first row address that includes fields for a first bank group address value, a first bank address value, and a first row of the bank address value. In response to the first command and by the memory device, a first single row of a first single DRAM bank of a first bank group of the memory device is activated, where the first single row was addressed by the first row address, the first single DRAM bank was addressed by the first bank address, and the first bank group was addressed by the first bank group address (406). For example, memory device 110 may, in response to the first command received by memory device 110, activate the single row addressed by the first bank group address value, in the bank addressed by the first bank address value in the bank group addressed by the first bank group address value.

By the memory device, a second command is received (408). For example, memory device 110 may receive a second command from controller 120. In association with the second command, and by the memory device, a second row address and a second bank group address are received (410). For example, in association with the second command, memory device 110 may receive a second row address that includes fields for a second bank group address value, a second bank address value, and a second row of the bank address value. In an example, memory device 110 may ignore the second bank address value.

In response to the second command and by the memory device, a plurality of single rows of a corresponding plurality of DRAM banks of a second bank group of the memory device are activated, where the plurality of single rows were addressed by the second row address, and the second bank group was addressed by the second bank group address (412). For example, memory device 110 may, in response to the second command received by memory device 110, activate the rows in each of memory arrays 130*a*-130*c* addressed by the second row of the bank address value.

Figure 5:
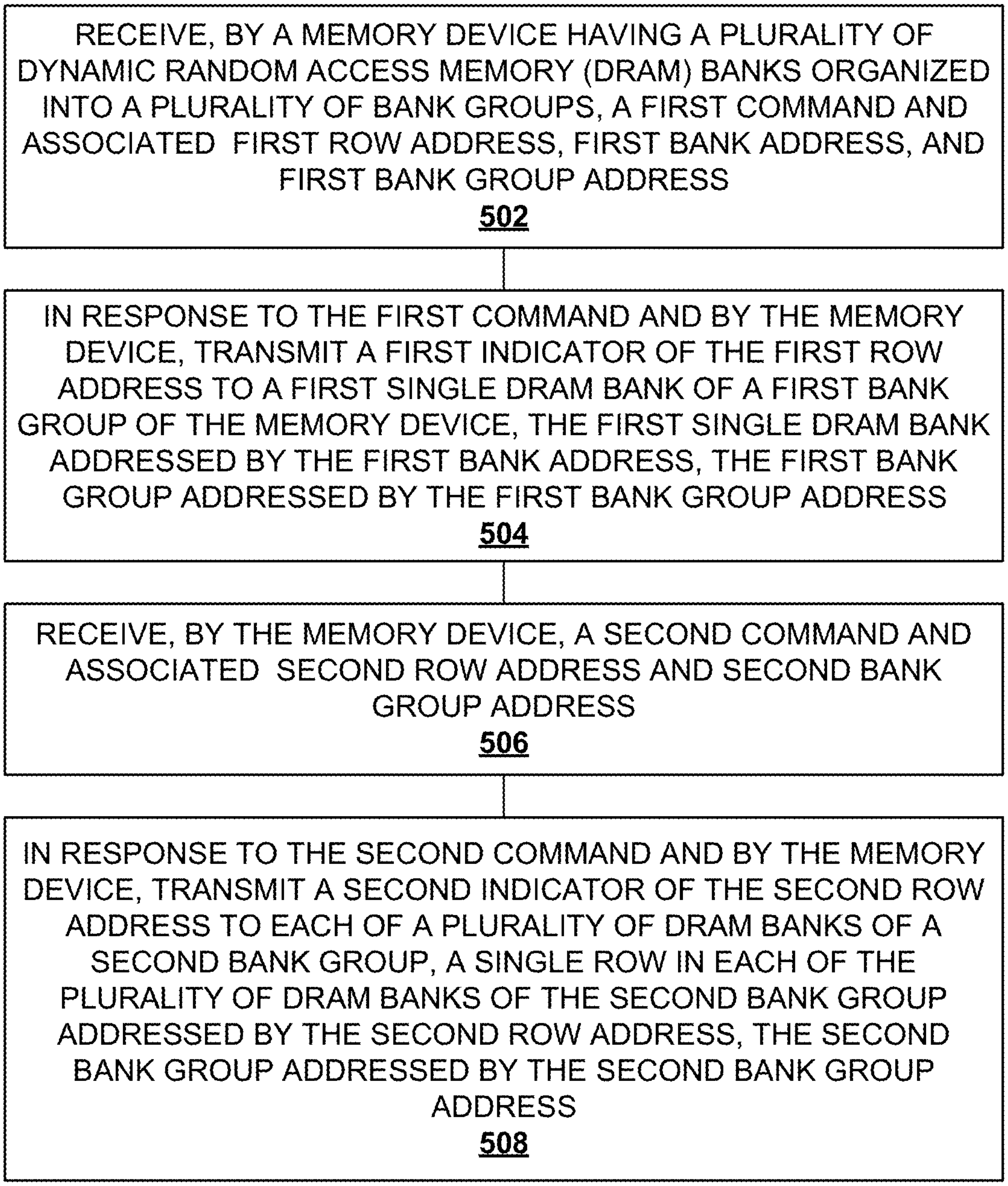
FIG. 5 is a flowchart illustrating a method of operating a memory device.

FIG. 5 is a flowchart illustrating a method of operating a memory device. One or more of the steps illustrated in FIG. 5 may be performed by, for example, memory system 100, and/or its components. By a memory device having a plurality of dynamic random access memory (DRAM) banks organized into a plurality of bank groups, a first command and associated first row address, first bank address, and first bank group address is received (502). For example, memory device 110, which has a plurality of DRAM banks (memory arrays 130*a*-130*c*) organized as a plurality of bank groups, may receive, from controller 120, a first command in association with fields having a first bank group address value, a first bank address value, and a first row value.

In response to the first command and by the memory device, a first indicator of the first row address is transmitted to a first single DRAM bank of a first bank group of the memory device where the first single DRAM bank was addressed by the first bank address and the first bank group was addressed by the first bank group address (504). For example, in response to the first command, memory device 110 may configure row address distribution circuitry 116 to transmit an indicator of the first row value to row circuitry 131*a* and not transmit the indicator of the first row value to row circuitry 131*b* and row circuitry 131*c*.

By the memory device, a second command and associated second row address and second bank group address is received (506). For example, memory device 110 may receive, from controller 120, a second command in association with fields having a second bank group address value and a second row value. In response to the second command and by the memory device, a second indicator of the second row address is transmitted to each of a plurality of DRAM banks of a second bank group, where a single row in each of the plurality of DRAM banks of the second bank group is addressed by the second row address and the second bank group is addressed by the second bank group address (508). For example, in response to the second command, memory device 110 may configure row address distribution circuitry 116 to transmit an indicator of the second row value to row circuitry 131*a*, row circuitry 131*b*, and row circuitry 131*c*.

Figure 6:
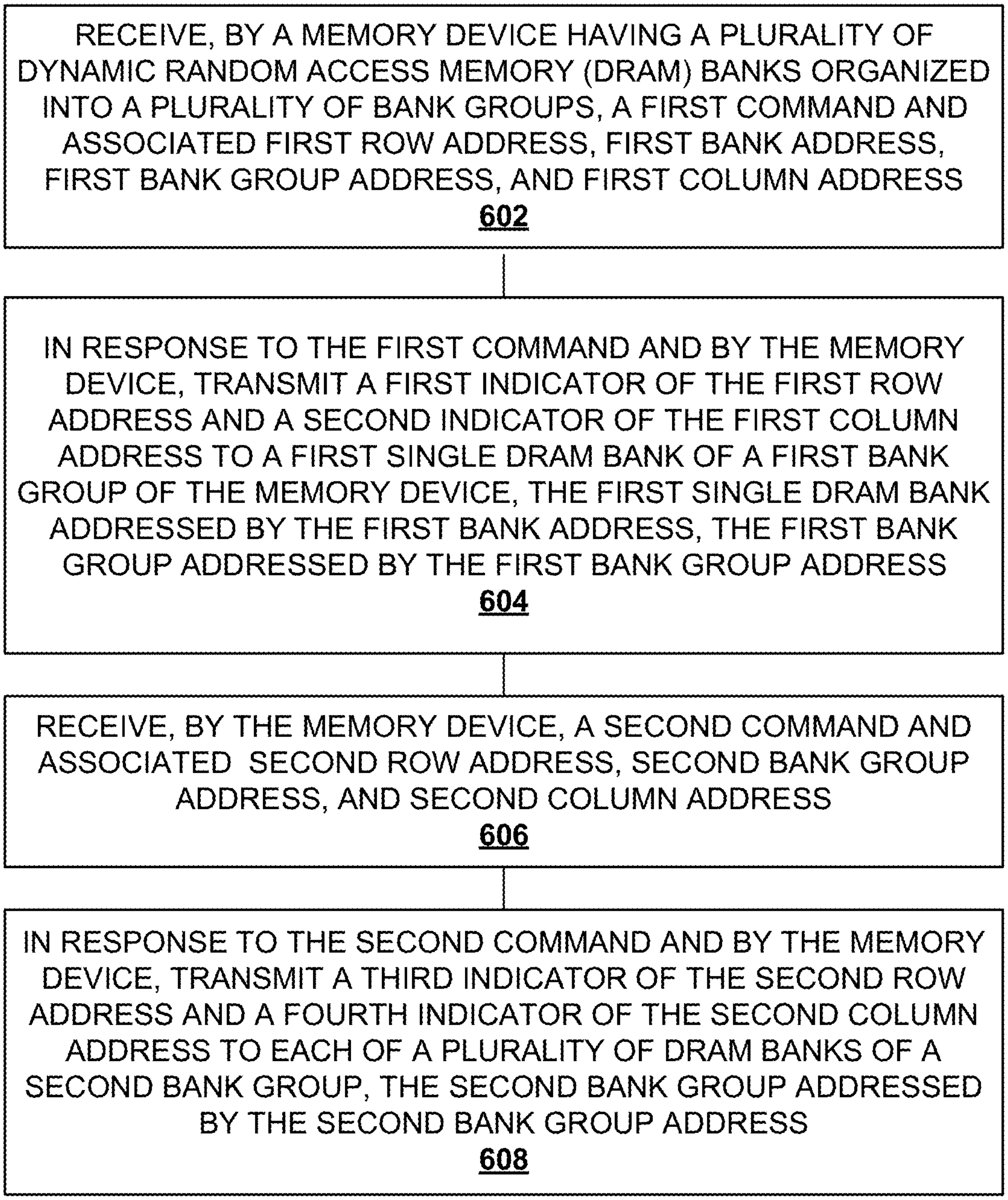
FIG. 6 is a flowchart illustrating a method of accessing memory banks.

FIG. 6 is a flowchart illustrating a method of accessing memory banks. One or more of the steps illustrated in FIG. 6 may be performed by, for example, memory system 100, and/or its components. By a memory device having a plurality of dynamic random access memory (DRAM) banks organized into a plurality of bank groups, a first command and associated first row address, first bank address, and first bank group address, and a first column address is received (602). For example, memory device 110, which has a plurality of DRAM banks (memory arrays 130*a*-130*c*) organized as a plurality of bank groups, may receive, from controller 120, fields having a first bank group address value, a first bank address value, a first row value, and a first column address value that are in association with a first command.

In response to the first command and by the memory device, a first indicator of the first row address and a second indicator of the first column address is transmitted to a first single DRAM bank of a first bank group of the memory device where the first single DRAM bank was addressed by the first bank address and the first bank group was addressed by the first bank group address (604). For example, in response to the first command, memory device 110 may configure row address distribution circuitry 116 to transmit an indicator of the first row value to row circuitry 131*a* and not transmit the indicator of the first row value to row circuitry 131*b* and row circuitry 131*c*, and memory device 110 may also configure column address distribution circuitry 117 to transmit an indicator of the first column value to column circuitry 132*a* and not transmit the indicator of the first column value to column circuitry 132*b* and column circuitry 132*c*.

By the memory device, a second command and associated second row address, second bank group address, and second column address is received (606). For example, memory device 110, may receive from controller 120, fields having a second bank group address value a second row value, and a second column address value in association with a second command. In response to the second command and by the memory device, a third indicator of the second row address and a fourth indicator of the second column address is transmitted to each of a plurality of DRAM banks of a second bank group, where the second bank group is addressed by the second bank group address (608). For example, in response to the second command, memory device 110 may configure row address distribution circuitry 116 to transmit an indicator of the second row value to row circuitry 131*a*, row circuitry 131*b*, and row circuitry 131*c*, and also configure column address distribution circuitry 117 to transmit an indicator of the second column value to column circuitry 132*a*, column circuitry 132*b*, and column circuitry 132*c*.

FIG. 7 is a flowchart illustrating a method of accessing a variable number of memory banks. One or more of the steps illustrated in FIG. 7 may be performed by, for example, memory system 100, and/or its components. To a memory device, a first command is transmitted where the memory device has a plurality of dynamic random access memory (DRAM) banks organized into a plurality of bank groups (702). For example, controller 120, under the control of control circuitry 125, may transmit a first command to memory device 110 which has a plurality of DRAM banks (memory arrays 130*a*-130*c*) organized as a plurality of bank groups.

In association with the first command, and to the memory device, a first row address, a first bank address, and a first bank group address are transmitted (704). For example, in association with the first command, controller 120 may transmit, to memory device 110, a first row address that includes fields for a first bank group address value, a first bank address value, and a first row of the bank address value. In response to the first command and from the memory device, first data stored by a first single row of a first single DRAM bank of a first bank group of the memory device is received, where the first single row was addressed by the first row address, the first single DRAM bank was addressed by the first bank address, and the first bank group was addressed by the first bank group address (706). For example, from memory device 110, controller 120 may receive, in response to the first command transmitted to memory device 110, a burst (e.g., 16 bytes) of data from the row addressed by the first bank group address value, the first bank address value, and the first row of the bank address value.

To the memory device, a second command is transmitted (708). For example, controller 120, under the control of control circuitry 125, may transmit a second command to memory device 110. In association with the second command, and to the memory device, a second row address and a second bank group address are transmitted (710). For example, in association with the second command, controller 120 may transmit, to memory device 110, a second row address that includes fields for a second bank group address value, a second bank address value, and a second row of the bank address value. In an example, the second bank address value may be ignored by memory device 110.

In response to the second command and from the memory device, metadata distributed across each of a plurality of single rows of a corresponding plurality of DRAM banks of a second bank group of the memory device is received, where the plurality of single rows were addressed by the second row address, and the second bank group was addressed by the second bank group address (712). For example, from memory device 110, controller 120 may receive, in response to the second command transmitted to memory device 110, a burst (e.g., 16 bytes) of data from the metadata column groups 130*ab*-130*cb* of the rows in each of memory arrays 130*a*-130*c* addressed by the second row of the bank address value.

Figure 8:
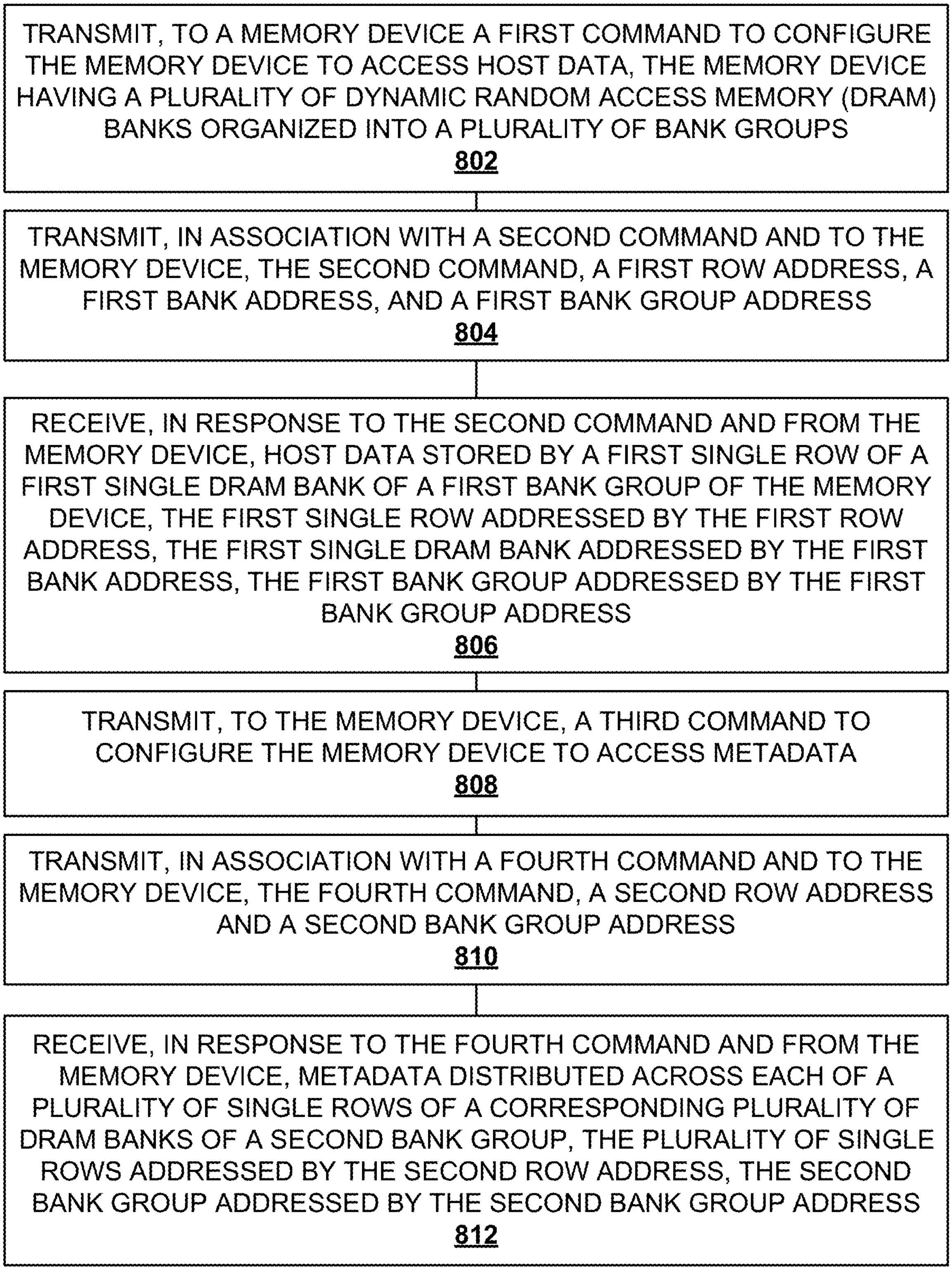
FIG. 8 is a flowchart illustrating a method of configuring a memory device to access host data and metadata.

FIG. 8 is a flowchart illustrating a method of configuring a memory device to access host data and metadata. One or more of the steps illustrated in FIG. 8 may be performed by, for example, memory system 100, and/or its components. To a memory device, a first command is transmitted to configure the memory device to access host data, where the memory device has a plurality of dynamic random access memory (DRAM) banks organized into a plurality of bank groups (802). For example, controller 120, under the control of control circuitry 125, may transmit a first command to memory device 110, which has a plurality of DRAM banks (memory arrays 130*a*-130*c*) organized as a plurality of bank groups, a command (e.g., MRS command) to place memory device 110 in a first mode that accesses data from data column groups 130*aa*-130*ca*. In another example, controller 120, under the control of control circuitry 125, may transmit an activate or precharge command to memory device 110 that indicates memory device 110 is to be placed in a first mode where subsequent associated column commands access (read or write) data from/to data column groups 130*aa*-130*ca*.

In association with a second command, and to the memory device, the second command, a first row address, a first bank address, and a first bank group address are transmitted (804). For example, in association with a second command, controller 120 may transmit, to memory device 110, the second command, a first row address that includes fields for a first bank group address value, a first bank address value, and a first row of the bank address value. In response to the second command and from the memory device, host data stored by a first single row of a first single DRAM bank of a first bank group of the memory device is received, where the first single row was addressed by the first row address, the first single DRAM bank was addressed by the first bank address, and the first bank group was addressed by the first bank group address (806). For example, from memory device 110, controller 120 may receive, in response to the second command transmitted to memory device 110, a burst (e.g., 16 bytes) of data from data column group 130*aa* of the row addressed by the first bank group address value, the first bank address value, and the first row of the bank address value.

To the memory device, a third command to configure the memory device to access metadata is transmitted (808). For example, controller 120, under the control of control circuitry 125, may transmit a third command to memory device 110, a command (e.g., MRS command) to place memory device 110 in a second mode that accesses data from metadata column group 130*ab*. In another example, controller 120, under the control of control circuitry 125, may transmit a "bank group" activate or "bank group" precharge command to memory device 110 that indicates memory device 110 is to be placed in a second mode where subsequent column commands access (read or write) data from/to data column group 130*ab*.

In association with the fourth command, and to the memory device, a second row address and a second bank group address are transmitted (810). For example, in association with the second command, controller 120 may transmit, to memory device 110, a second row address that includes fields for a second bank group address value, a second bank address value, and a second row of the bank address value. In an example, the second bank address value may be ignored by memory device 110.

In response to the fourth command and from the memory device, metadata distributed across each of a plurality of single rows of a corresponding plurality of DRAM banks of a second bank group of the memory device is received, where the plurality of single rows were addressed by the second row address, and the second bank group was addressed by the second bank group address (812). For example, from memory device 110, controller 120 may receive, in response to the fourth command transmitted to memory device 110, a burst (e.g., 16 bytes) of data from the metadata column groups 130*ab*-130*cb* of the rows in each of memory arrays 130*a*-130*c* addressed by the second row of the bank address value.

Figure 9:
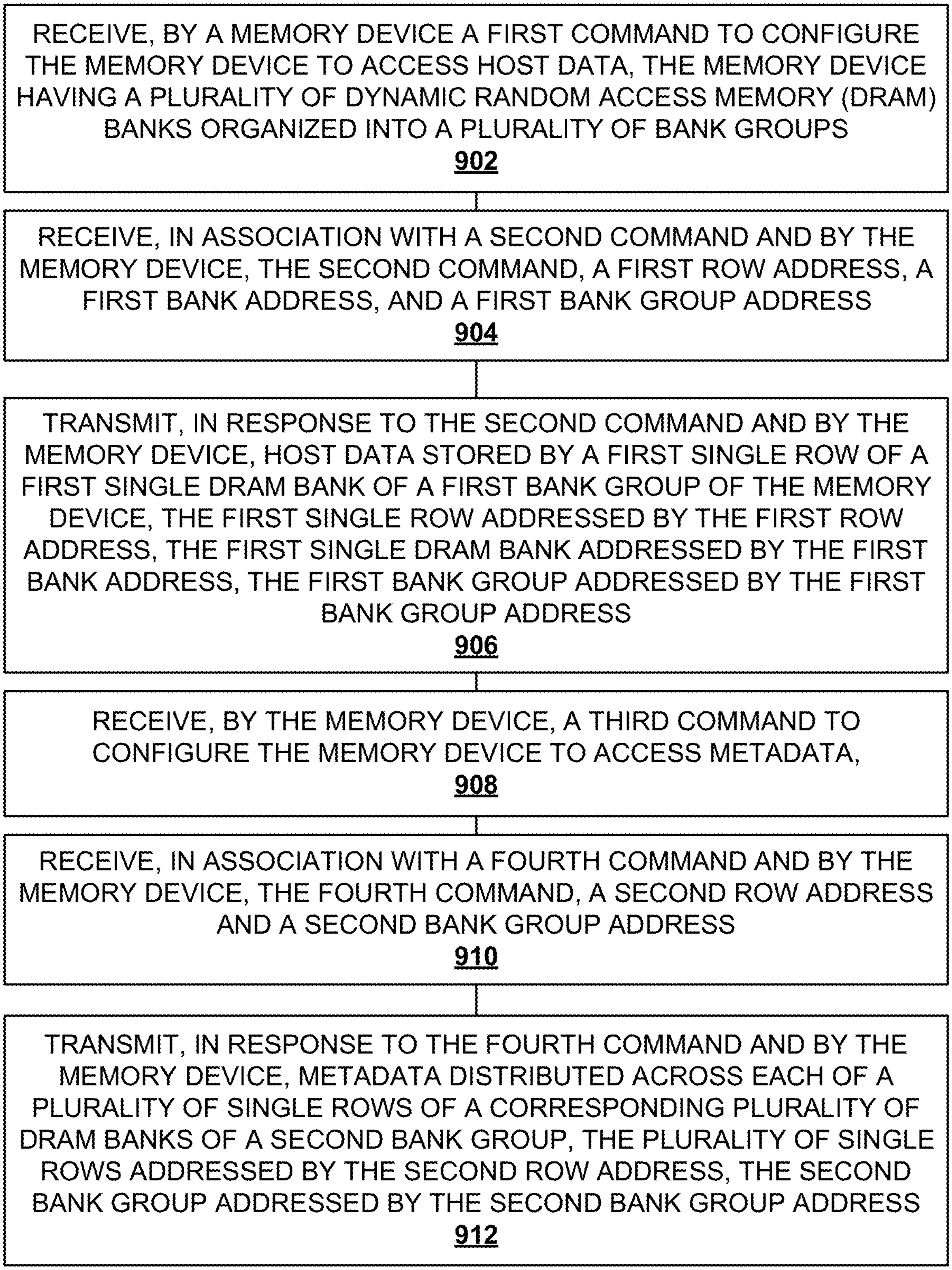
FIG. 9 is a flowchart illustrating a method of operating a memory device to access host data and metadata.

FIG. 9 is a flowchart illustrating a method of operating a memory device to access host data and metadata. One or more of the steps illustrated in FIG. 9 may be performed by, for example, memory system 100, and/or its components. By a memory device, a first command to configure the memory device to access host data is received, where the memory device has a plurality of dynamic random access memory (DRAM) banks organized into a plurality of bank groups (902). For example, memory device 110 may receive, from controller 120, a first command to place memory device 110 in a first mode that accesses data from data column groups 130*aa*-130*ca*. In another example, memory device 110 may receive an activate or precharge command, from controller 120, that indicates memory device 110 is to be placed in a first mode where subsequent associated column commands access (read or write) data from/to data column group 130*aa*.

In association with a second command, and by the memory device, the second command, a first row address, a first bank address, and a first bank group address are received (904). For example, in association with a second command, memory device 110 may receive a first row address that includes fields for a first bank group address value, a first bank address value, and a first row of the bank address value. In response to the second command and by the memory device, host data stored by a first single row of a first single DRAM bank of a first bank group of the memory device is transmitted, where the first single row was addressed by the first row address, the first single DRAM bank was addressed by the first bank address, and the first bank group was addressed by the first bank group address (906). For example, by memory device 110 and in response to the second command received by memory device 110, a burst (e.g., 16 bytes) of data from data column group 130*aa* of the row addressed by the first bank group address value, the first bank address value, and the first row of the bank address value may be transmitted.

By the memory device, a third command to configure the memory device to access metadata is received (908). For example, memory device 110 may receive a third command (e.g., MRS command) to place memory device 110 in a second mode that accesses data from metadata column groups 130*ab*-130*cb*. In another example, memory device 110 may receive a "bank group" activate or "bank group" precharge command, from controller 120, that indicates memory device 110 is to be placed in a second mode where subsequent column commands access (read or write) data from/to data column group 130*ab*.

In association with the fourth command, and by the memory device, a second row address and a second bank group address are received (910). For example, in association with the second command, memory device 110 may receive a second row address that includes fields for a second bank group address value, a second bank address value, and a second row of the bank address value. In an example, the second bank address value may be ignored by memory device 110.

In response to the fourth command and by the memory device, metadata distributed across each of a plurality of single rows of a corresponding plurality of DRAM banks of a second bank group of the memory device are transmitted, where the plurality of single rows were addressed by the second row address, and the second bank group was addressed by the second bank group address (912). For example, by memory device 110 and in response to the fourth command received by memory device 110, a burst (e.g., 16 bytes) of data from the metadata column groups 130*ab*-130*cb* of the rows in each of memory arrays 130*a*-130*c* addressed by the second row of the bank address value may be transmitted.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of memory system 100, and its components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 10:
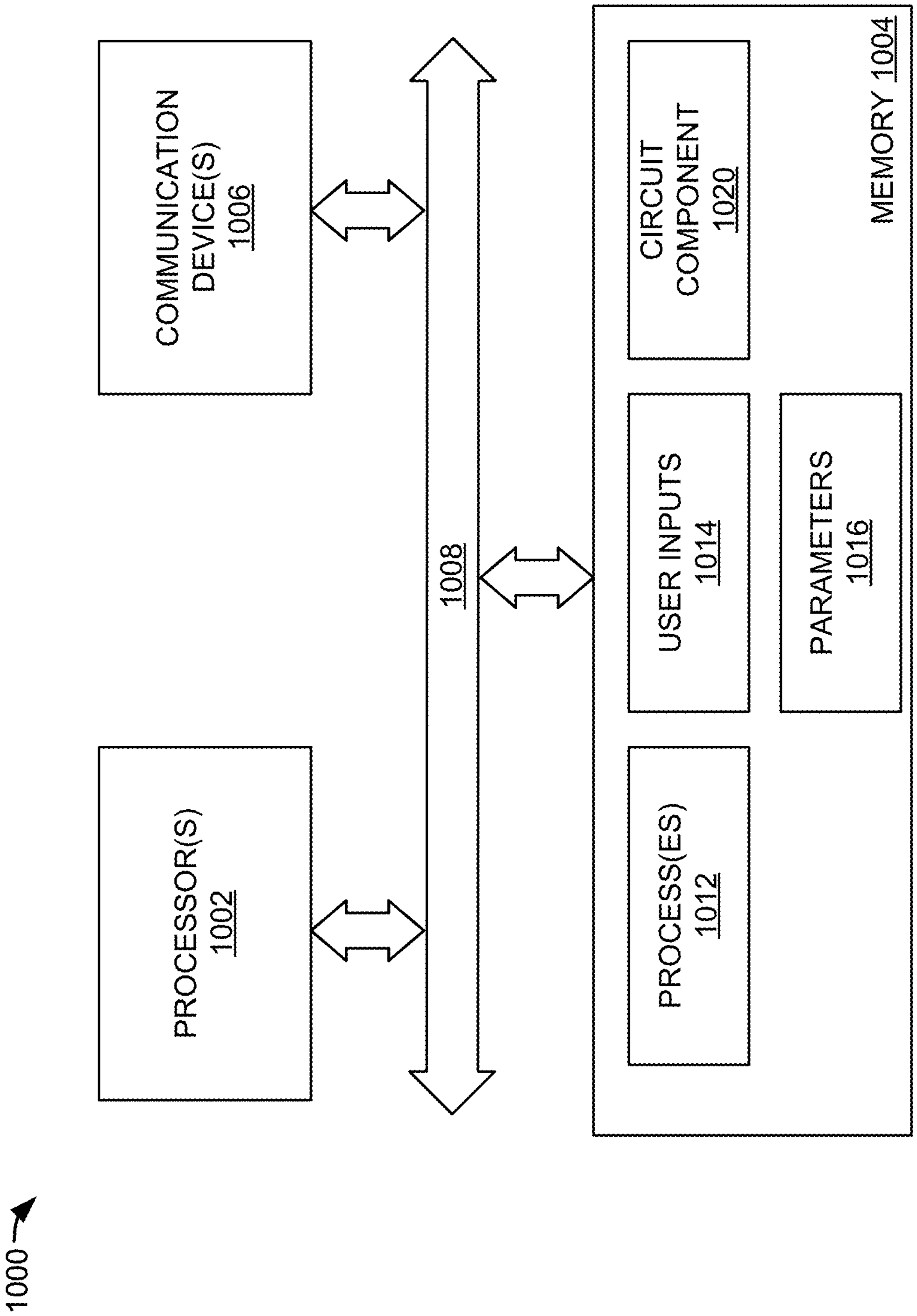
FIG. 10 is a block diagram of a processing system.

FIG. 10 is a block diagram illustrating one embodiment of a processing system 1000 for including, processing, or generating, a representation of a circuit component 1020. Processing system 1000 includes one or more processors 1002, a memory 1004, and one or more communications devices 1006. Processors 1002, memory 1004, and communications devices 1006 communicate using any suitable type, number, and/or configuration of wired and/or wireless connections 1008.

Processors 1002 execute instructions of one or more processes 1012 stored in a memory 1004 to process and/or generate circuit component 1020 responsive to user inputs 1014 and parameters 1016. Processes 1012 may be any suitable electronic design automation (EDA) tool or portion thereof used to design, simulate, analyze, and/or verify electronic circuitry and/or generate photomasks for electronic circuitry. Representation 1020 includes data that describes all or portions of memory system 100, and its components, as shown in the Figures.

Representation 1020 may include one or more of behavioral, register transfer, logic component, transistor, and layout geometry-level descriptions. Moreover, representation 1020 may be stored on storage media or communicated by carrier waves.

Data formats in which representation 1020 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 1014 may comprise input parameters from a keyboard, mouse, voice recognition interface, microphone and speakers, graphical display, touch screen, or other type of user interface device. This user interface may be distributed among multiple interface devices. Parameters 1016 may include specifications and/or characteristics that are input to help define representation 1020. For example, parameters 1016 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1004 includes any suitable type, number, and/or configuration of non-transitory computer-readable storage media that stores processes 1012, user inputs 1014, parameters 1016, and circuit component 1020.

Communications devices 1006 include any suitable type, number, and/or configuration of wired and/or wireless devices that transmit information from processing system 1000 to another processing or storage system (not shown) and/or receive information from another processing or storage system (not shown). For example, communications devices 1006 may transmit circuit component 1020 to another system. Communications devices 1006 may receive processes 1012, user inputs 1014, parameters 1016, and/or circuit component 1020 and cause processes 1012, user inputs 1014, parameters 1016, and/or circuit component 1020 to be stored in memory 1004.

Implementations discussed herein include, but are not limited to, the following examples:

Example 1: A memory device, comprising: a command/address (CA) interface to receive commands and addresses, the addresses including a first row address, a first bank address, a first bank group address associated with a first command, and also including a second row address, and a second bank group address associated with a second command; circuitry to access, in a first mode, a first single row, addressed by the first row address, of a first single DRAM bank, addressed by the first bank address of a first bank group addressed by the first bank group address, the circuitry to also concurrently access, in a second mode, each of a plurality of single rows of a corresponding plurality of DRAM banks of a second bank group, the plurality of single rows addressed by the second row address, the second bank group addressed by the second bank group address; and row address steering circuitry to, in the second mode, provide the second row address to the plurality of DRAM banks.

Example 2: The memory device of example 1, further comprising: column address steering circuitry to, in the second mode, provide a column address, received via the CA interface to the plurality of DRAM banks.

Example 3: The memory device of example 1, further comprising: data steering circuitry to, in the second mode, communicate data between respective data (DQ) signal pins and respective ones of the plurality of DRAM banks.

Example 4: The memory device of example 3, wherein, a second single DRAM bank is one of the plurality of DRAM banks and, in the first mode, the data steering circuitry communicates data stored using a first set of columns of the second single DRAM bank with the DQ signal pins and, in the second mode, the data steering circuitry communicates data stored using a second set of columns of the second single DRAM bank, where the first set of columns and the second set of columns are non-overlapping sets.

Example 5: The memory device of example 1, wherein a first access delay associated with accessing in the first mode is less than a second access delay associated with accessing in the second mode.

Example 6: The memory device of example 1, wherein the first mode and second mode are entered and exited based on mode register set commands.

Example 7: The memory device of example 1, wherein the second mode is entered from the first mode in response to a multi-bank access command.

Example 8: The memory device of example 1, wherein the second command causes the memory device to enter the second mode.

Example 9: A controller, comprising: a command/address (CA) interface to transmit commands and addresses to a memory device, the commands including a first command associated with a first row address, a first bank address, a first bank group address, a second command associated with a second row address, and a second bank group address; and a data interface to, based on the first command transmitted while the memory device is in a first mode, communicate data associated with a first single row of a first single DRAM bank of a first bank group, the first single row addressed by the first row address, the first single DRAM bank addressed by the first bank address, the first bank group addressed by the first bank group address, and to, based on the second command, communicate, while the memory device is in a second mode, data associated with each of a plurality of single rows of a corresponding plurality of DRAM banks of a second bank group, the plurality of single rows addressed by the second row address, the second bank group addressed by the second bank group address.

Example 10: The controller of example 9, wherein a first delay, while in the first mode, from transmitting the first command to communicating data via the data interface is less than a second delay, while in the second mode, from transmitting the second command to communicating data via the data interface.

Example 11: The controller of example 9, wherein the controller is to further transmit, via the CA interface, a third command to change the memory device from the first mode to the second mode.

Example 12: The controller of example 11, wherein the third command is a mode register set command.

Example 13: The controller of example 11, wherein the third command is a multi-bank access command.

Example 14: The controller of example 9, wherein the second command changes the memory device from the first mode to the second mode.

Example 15: A method of operating a memory device, comprising: transmitting, to a memory device; a first command sequence, the memory device having a plurality of dynamic random access memory (DRAM) banks organized into a plurality of bank groups; transmitting, in association with the first command sequence and to the memory device, a first row address, a first bank address, and a first bank group address; receiving, in response to the first command sequence and from the memory device, first data stored by a first single row of a first single DRAM bank of a first bank group of the memory device, the first single row addressed by the first row address, the first single DRAM bank addressed by the first bank address, the first bank group addressed by the first bank group address; transmitting, to the memory device, a second command sequence; transmitting, in association with the second command sequence and to the memory device, a second row address and a second bank group address; and receiving, in response to the second command sequence and from the memory device, second data stored by each of a plurality of single rows of a corresponding plurality of DRAM banks of a second bank group, the plurality of single rows addressed by the second row address, the second bank group addressed by the second bank group address.

Example 16: The method of example 15, wherein the first command sequence is transmitted to the memory device when the memory device is in a first mode.

Example 17: The method of example 15, wherein the second command sequence changes the memory device from a first mode to a second mode.

Example 18: The method of example 15, further comprising: transmitting a third command sequence that places the memory device is a second mode.

Example 19: The method of example 17, further comprising: transmitting a fourth command sequence that changes the memory device from the second mode to the first mode.

Example 20: The method of example 15, further comprising: based on the memory device being in a first mode, waiting a first duration of time between transmitting the first command sequence and receiving the first data; and based on the memory device being in a second mode, waiting a second duration of time between transmitting the second command sequence and receiving the second data, the first duration of time and the second duration of time being unequal.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory device, comprising:

a command/address (CA) interface to receive commands and addresses, the addresses including a first row address, a first bank address, a first bank group address associated with a first command, and also including a second row address, and a second bank group address associated with a second command;

circuitry to, based on the memory device being in a first mode, access a first single row, addressed by the first row address, of a first single DRAM bank, addressed by the first bank address of a first bank group addressed by the first bank group address, the circuitry to also, based on the memory device being in a second mode, concurrently access each of a plurality of single rows of a corresponding plurality of DRAM banks of a second bank group, the plurality of single rows addressed by the second row address, the second bank group addressed by the second bank group address, the plurality of DRAM banks of the second bank group including a second single DRAM bank;

data steering circuitry to, based on receiving a first instance of a column address via the CA interface while the memory device is in the first mode, be configured to communicate data stored using a first set of columns of the second single DRAM bank with data (DQ) signal pins, the data steering circuitry to also, based on receiving a second instance of the column address via the CA interface while the memory device is in the second mode, be configured to communicate data stored using a second set of columns of the second single DRAM bank with the DQ signal pins, where the first set of columns and the second set of columns are non-overlapping sets; and row address steering circuitry to, based on the memory device being in the second mode, provide the second row address to the plurality of DRAM banks.

2. The memory device of claim 1, further comprising:

column address steering circuitry to, in the second mode, provide indicators of the column address to the plurality of DRAM banks.

3. The memory device of claim 1, wherein the data steering circuitry is to, based on the memory device being in the second mode, be configured to communicate data between respective data (DQ) signal pins and respective ones of the plurality of DRAM banks.

4. The memory device of claim 1, wherein a first access delay associated with accessing in the first mode is less than a second access delay associated with accessing in the second mode.

5. The memory device of claim 1, wherein the first mode and second mode are entered and exited based on mode register set commands.

6. The memory device of claim 1, wherein the second mode is entered from the first mode in response to a multi-bank access command.

7. The memory device of claim 1, wherein the second command causes the memory device to enter the second mode.

8. A controller, comprising:

a command/address (CA) interface to transmit commands and addresses to a memory device, the memory device having a plurality of memory arrays each having a plurality of row data columns and a plurality of metadata information columns, where the plurality of row data columns and the plurality of metadata information columns are non-overlapping sets of columns, the commands including a first command associated with a first row address, a first bank address, a first bank group address, a second command associated with a second row address, and a second bank group address; and a data interface to, based on the memory device receiving a first instance of a column address via the CA interface while the memory device is in a first mode, communicate, with the memory device, data associated with the plurality of row data columns of a first single row of a first single DRAM bank of a first bank group, the first single row addressed by the first row address, the first single DRAM bank addressed by the first bank address, the first bank group addressed by the first bank group address, and to, based on the memory device receiving a second instance of the column address via the CA interface while the memory device is in a second mode, communicate, with the memory device, data associated with the plurality of metadata information columns of each of a plurality of single rows of a corresponding plurality of DRAM banks of a second bank group that are communicated by the memory device, the plurality of single rows addressed by the second row address, the second bank group addressed by the second bank group address.

9. The controller of claim 8, wherein the second command changes the memory device from the first mode to the second mode.

10. The controller of claim 8, wherein a first delay, while in the first mode, from transmitting the first command to communicating data via the data interface is less than a second delay, while in the second mode, from transmitting the second command to communicating data via the data interface.

11. The controller of claim 8, wherein the controller is to further transmit, via the CA interface, a third command to change the memory device from the first mode to the second mode.

12. The controller of claim 11, wherein the third command is a mode register set command.

13. The controller of claim 11, wherein the third command is a multi-bank access command.

14. A method of operating a memory device, comprising:

transmitting, to a memory device, a first command sequence, the memory device having a plurality of dynamic random access memory (DRAM) banks organized into a plurality of bank groups, the plurality of DRAM banks each having a plurality of row data columns and a plurality of metadata information columns, where the plurality of row data columns and the plurality of metadata information columns are non-overlapping sets of columns;

transmitting, in association with the first command sequence and to the memory device, a first row address, a first bank address, and a first bank group address;

receiving, in response to the first command sequence and based on the memory device receiving a first instance of a column address while the memory device is in a first mode, and from the memory device, first data stored by the plurality of row data columns of a first single row of a first single DRAM bank of a first bank group of the memory device that is transmitted by the memory device based on the memory device being in the first mode, the first single row addressed by the first row address, the first single DRAM bank addressed by the first bank address, the first bank group addressed by the first bank group address;

transmitting, to the memory device, a second command sequence;

transmitting, in association with the second command sequence and to the memory device, a second row address and a second bank group address; and receiving, in response to the second command sequence and based on the memory device receiving a second instance of the column address while the memory device is in a second mode, and from the memory device, second data stored by the metadata information columns of each of a plurality of single rows of a corresponding plurality of DRAM banks of a second bank group that is transmitted by the memory device based on the memory device being in the second mode, the plurality of single rows addressed by the second row address, the second bank group addressed by the second bank group address.

15. The method of claim 14, further comprising:

based on the memory device being in the first mode, waiting a first duration of time between transmitting the first command sequence and receiving the first data; and based on the memory device being in the second mode, waiting a second duration of time between transmitting the second command sequence and receiving the second data, the first duration of time and the second duration of time being unequal.

16. The method of claim 14, wherein the first command sequence is transmitted to the memory device when the memory device is in the first mode.

17. The method of claim 14, wherein the second command sequence changes the memory device from the first mode to the second mode.

18. The method of claim 14, further comprising:

transmitting a third command sequence that places the memory device in the second mode.

19. The method of claim 18, further comprising:

transmitting a fourth command sequence that changes the memory device from the second mode to the first mode.

* * * * *